United States Patent [19]

Matsui

[11] Patent Number: 4,830,991

[45] Date of Patent: May 16, 1989

[54] SILICON NITRIDE SINTERED BODIES

[75] Inventor: Minoru Matsui, Nagoya, Japan

[73] Assignee: NGK Insulators, Ltd., Japan

[21] Appl. No.: 19,252

[22] Filed: Feb. 26, 1987

[30] Foreign Application Priority Data

Mar. 6, 1986 [JP] Japan .................. 61-47410

[51] Int. Cl.$^4$ ............................. C04B 35/58
[52] U.S. Cl. ........................ 501/97; 501/98
[58] Field of Search .................. 501/97, 98

[56] References Cited

U.S. PATENT DOCUMENTS

| | | | |
|---|---|---|---|
| 4,102,698 | 7/1978 | Lange et al. | 501/98 |
| 4,180,410 | 12/1979 | Masaki | 501/98 |
| 4,280,973 | 7/1981 | Moskowitz et al. | 264/63 |
| 4,388,414 | 6/1983 | Mangels et al. | 501/98 |
| 4,506,021 | 3/1985 | Jack et al. | 264/65 |
| 4,535,063 | 8/1985 | Matsuhiro et al. | 501/97 |

FOREIGN PATENT DOCUMENTS

| | | |
|---|---|---|
| 0107919 | 5/1984 | . |
| 2528869 | 6/1974 | Fed. Rep. of Germany . |
| 2820694 | 11/1978 | Fed. Rep. of Germany . |
| 2937740 | 4/1980 | Fed. Rep. of Germany . |
| 3039827 | 5/1981 | Fed. Rep. of Germany . |
| 56-59674 | 5/1981 | Japan . |
| 58-50944 | 11/1983 | Japan . |
| 59-008670 | 1/1984 | Japan . |
| 8000079 | 1/1980 | PCT Int'l Appl. . |
| 2032414 | 5/1980 | United Kingdom . |

OTHER PUBLICATIONS

838 American Ceramic Society Bulletin, "Fabrication and Properties of Dense Polyphase Silicon Nitride", vol. 62 (1983) Dec., No. 12, Columbus, Ohio.

838 American Ceramic Society Bulletin, "$Si_3N_4$-$Ce_2O_3$-$SiO_2$ Materials:Phase Relations and Strength", vol. 59 (1980) Feb., No. 2, Columbus, OH.

836 Journal of the American Ceramic Society, "The System $Si_3N_4$-$SiO_2$-$Y_2O_3$", vol. 63 (1980), Jan., Feb., No. 1-2, Columbus, OH.

Journal of the American Ceramic Society, "Fracture of Yhria-Doped, Sintered Reaction-Bonded Silicon Nitride", vol. 68 (1985) Jul., No. 7, Columbus, OH.

6053 Journal of Materials Science, "Development of Microstructure During the Fabrication of $Si_3N_4$ by Nitridation and Pressureless Sintering of Si:$Si_3N_4$ Compacts", vol. 20 (1985) Oct., No. 10, London, Great Britain.

Giachello, A. et al., "Sintering and Properties of Silicon Nitride Containing $Y_2O_3$ and $MgO_3$" Ceramic Bull., 59(2) 1980, pp. 1212-1215.

Primary Examiner—William R. Dixon, Jr.
Assistant Examiner—Anthony Green

[57] ABSTRACT

Silicon nitride sintered bodies are disclosed herein which each contain an intergranular phase. The intergranular phase contained in the sintered body is crystallized into diopside structure type crystals and apatite structure type crystals. The silicon nitride sintered bodies have excellent density and mechanical strength as well as extremely excellent static fatigue characteristics, and therefore are applicable as various mechanical structural parts such as engine parts, gas turbine parts, etc.

5 Claims, 1 Drawing Sheet

Diffraction Angle (2θ)

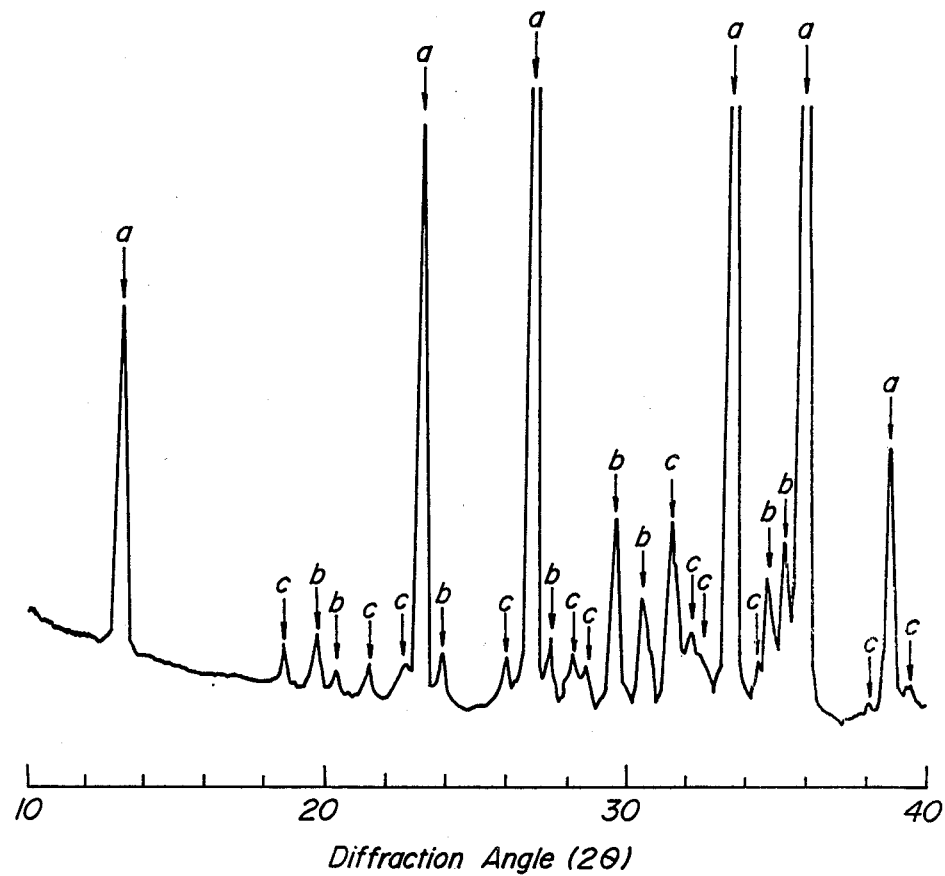

SILICON NITRIDE SINTERED BODIES

BACKGROUND OF THE INVENTION

1. Field of the Invention

The present invention relates to high density silicon nitride sintered bodies having excellent mechanical strength and oxidation resistance. More specifically, the invention relates to high density silicon nitride sintered bodies which particularly have excellent static fatigue characteristics and in which an intergranular phase is substantially crystallized into a diopside structure type crystals and apatite structure type crystals.

2. Related Art Statement

Since the silicon nitride sintered bodies are more excellent in terms of mechanical strength at high temperatures, thermal resistance, thermal shock resistance, and corrosion resistance than metallic materials, the former have been examined to be applied to high temperature structural members for which the latter can not be used, and uses of the former have been actively being developed.

Silicon nitride is a covalent substance, and therefore cannot be easily sintered through a solid phase. Thus, it is sintered through a liquid phase in which the silicon nitride is densified through production of a glass phase at a firing temperature under addition of $Y_2O_3$, $Al_2O_3$, $MgO$, $CeO_2$, $SiO_2$, $ZrO_2$, a rare earth oxide, AlN, or the like. For this reason, the silicon nitride sintered bodies thus obtained each contain a large amount of the glass phase produced in the grain boundaries during firing. Thus, when a use temperature is high, the intergranular glass phase is softened so that the mechanical strength and the oxidation resistance are lowered, while the characteristics of static fatigue due to creep deformation and creep rupture are deteriorated.

Under these circumstances, there have been studied methods of diminishing the glass phase through crystallizing the intergranular phase. For instance, Japanese patent application Laid-open No. 55-3,397 discloses silicon nitride sintered bodies which are fired with addition of $Y_2O_3$ and $SiO_2$ and contain a crystalline phase consisting of $Y_2O_3.2SiO_2$ and $10Y_2O_3.9SiO_2.Si_3N_4$ at grain boundaries. Japanese Patent application Laid-open No. 56-59,674 discloses silicon nitride sintered bodies which are fired with addition of $Y_2O_3$ and contain $xY_2O_3.ySi_3N_4$ crystalline phase in grain boundaries. Further, Japanese patent application Laid-open No. 59-8,670 discloses silicon nitride sintered bodies in which an intergranular phase is a mellitite mineral phase represented by (Si, Mg, Y) (O, N). Japanese patent publication No. 58-50,944 discloses a method of crystallizing $Y_2O_3.Si_2N_4$ or $Ce_2O_3.Si_3N_4$ in an intergranular phase by reheating a silicon nitride sintered body added with $Y_2O_3$ or $CeO_2$. Furthermore, F.F. Lange "CERAMIC BULLETIN 62 (12) 1369–1374" shows that an intergranular phase is crystallized into $Y_5(SiO_4)_3N$ crystals of an apatite structure. Each of the above silicon nitride sintered bodies having the intergranular crystalline phase has an improved high temperature strength.

However, since the grain boundaries are crystallized during a cooling step from a firing temperature or a reheating step in an inert atmosphere, the crystallized phase formed at the grain boundaries are not necessarily stable in an oxidative atmosphere as ordinary use conditions. Consequently, when they are used in the oxidative atmosphere, the crystalline phase varies and its volume locally changes, so that cracks are formed to greatly deteriorate mechanical strength and oxidation resistance. While the silicon nitride sintered bodies in which a majority part of grain boundaries are made of a crystalline phase is free from creep deformation and creep rupture because softening of the intergranular glass phase under a static loading does not occur at high temperatures, they are statically fatigued, without being deformed, due to a subcritical crack growth in which initial stage defects granually progress. Then, they are fractured after a given time period even under a stress lower than that corresponding to an instant fracture strength such as a bending resistive strength, etc. This static fatigue characteristics can be evaluated based on a stress dependency of a time in which the silicon nitride is fractured. The subcritical crack growth causing the static fatigue is considered to be influenced by thermal and chemical stabilities and a mechanical strength of the intergranular phase, a stress developed in the microstructure during cooling from the firing temperature owing to a difference in thermal expansion between the intergranular phase and the $Si_3N_4$ crystalline particles, adhesion between the intergranular phase and the $Si_3N_4$ crystalline particles, a quality and an amount of the residual glass phase, etc. The silicon nitride sintered bodies having the crystallized intergranular phase has a shortcoming that its reliability as a material of parts to be used for a long time period under a stress is lowered due to a static fatigue fracture caused by this subcritical crack growth.

SUMMARY OF THE INVENTION

The present invention has been accomplished to solve the above-mentioned problems.

That is, it is an object of the present invention to provide high density silicon nitride sintered bodies in which its intergranular phase is substantially crystallized and which have a high strength at high temperature and excellent static fatigue characteristic while being free from creep deformation or subcritical crack growth owing to a static stress.

More specifically, the object of the present invention is to provide silicon nitride sintered bodies which will not fracture for a specific time period or forever at a temperature range of not more than 1,000° C. under a static stress smaller than that corresponding to an instant fracture strength.

According to the silicon nitride sintered bodies of the present invention, the intergranular phase is substantially crystallized into diopside structure type crystals and apatite structure type crystals.

These and other objects, features and advantages of the invention will be appreciated upon reading of the following description of the invention when taken in connection with the attached drawing with understanding that some modifications, variations, and changes of the same could be made by the skilled person in the art to which the invention pertains without departing from the spirit of the invention or the scope of claims appended hereto.

BRIEF DESCRIPTION OF THE DRAWING

For a better understanding of the invention, reference is made to the attached drawing, wherein:

a sole FIGURE is a diagram showing a diffraction pattern of a silicon nitride sintered body (Example 5) according to the present invention in an X-ray diffraction analysis using CuK line.

DETAILED DESCRIPTION OF THE INVENTION

The silicon nitride sintered bodies according to the present invention are characterized in that the intergranular phase is substantially crystallized into diopside structure type crystals and apatite structure type crystals.

The diopside structure is a crystalline structure of a monoclinic system of crystals represented by $CaMgSi_2O_6$. In the crystallized intergranular phase of the silicon nitride sintered bodies according to the present invention, crystalographical positions of Ca are occupied by Ca, Y, a rare earth element, Mg, Fe, or Ni; crystallographical positions of Mg are occupied by Mg, Al, Fe, Ni, or Si; crystallographical positions of Si are occupied by Si, or Al; and crystallographical positions of O are occupied by O or N. The diopside structure type crystals may include $Ca(Mg, Fe, Al)(Si, Al)_2O_6$ given in JCPDS card 25-1217 and crystals composed of the above various elements as well as solid solutions thereof. The apatite structure is a crystalline structure of hexagonal system crystals represented by $Ca(SiO_4)_3F$. In the crystallized intergranular phase of the silicon nitride sintered bodies according to the present invention, crystallographical positions of Ca are occupied by Ca, Y, a rare earth element, Mg, Fe, or Ni; the crystallographical positions of Si are occupied by Si, or Al; the crystallographical positions of O are occupied O or N; and the crystallographical portions of F are occupied by O or N. The apatite structure type crystals may include $Ce_{4.67}(SiO_4)_3O$ shown in JCPDS card 30-336, $Y_5(SiO_4)_3N$ shown in 30-1462, and $(Y_4Mg)(SiO_4)_3O$ shown in 20-1410 as well as crystals composed of the above various elements including their solid solutions. The silicon nitride sintered bodies according to the present invention have the intergranular phase which is crystallized into mixed crystals of the diopside structure type crystals and the apatite structure type crystals. As compared with the silicon nitride sintered bodies in which the intergranular phase is crystallized into the apatite structure type crystals only, the silicon nitride sintered bodies according to the present invention in which the intergranular phase is crystallized into mixed crystals of the diopside structure and the apatite structure have an improved static fatigue resistance and widen an acceptable composition range.

Preferably the X-ray diffraction intensity ratio of the crystals of diopside structure to the crystal of apatite structure is more than 0.2, because of the improvement of static fatigue property.

The X-ray diffraction intensity ratio is the $CuK_\alpha$ diffraction peak heights ratio of $2\theta \approx 29.8°$ of the crystal of diopside structure and $2\theta \approx 30.8°$ of the crystal of apatite structure.

Now, the silicon nitride sintered bodies according to the present invention will be explained.

Since the silicon nitride sintered bodies according to the present invention are intended to be used for the high temperature structural members, they have such a high density and a high strength that a bulky density is not more than $3.1 \text{ g/cm}^3$ and strength at both room temperature and at 1,200° C. is not less than 600 MPa. The silicon nitride sintered bodies according to the present invention contains not less than 70% by weight of $Si_3N_4$ particles in which 70% by weight of the $Si_3N_4$ particles are $\beta$-$Si_3N_4$ needle-like particles. In the silicon nitride sintered bodies of the present invention, the intergranular phase of the $Si_3N_4$ particles is crystallized into the diopside structure type crystals and the apatite structure type crystals.

The intergranular phase of the silicon nitride sinterd bodies is crystallized by firing and densifying a molding of a formulated $Si_3N_4$ raw material powder added with a sintering aid and then crystallizing a glass phase present in the $Si_3N_4$ particle intergranular phase during a cooling step in the firing or during a reheating step. Therefore, the phase crystallized in the intergranular phase of the silicon nitride sintered body varies depending upon the composition of the glass phase existing in the intergranular phase and the shape of the glass phase in the microstructure after the sintering, the interaction between the glass phase and the coexistent $Si_3N_4$ particles, a crystallizing temperature, a temperature gradient, and a surrounding atmosphere. In addition, the composition of the glass phase and the microstructure between the glass phase and the $Si_3N_4$ particles vary depending upon $Si_3N_4$ raw material, an additive composition, physical properties of additive ingredients, powder treatments such as mixing, milling, etc., a molding way, and a firing way. Particularly, the crystalline phase crystallized in the intergranular phase of the silicon nitride sintered body conspicuously depends upon an amount of oxygen in the composition of the glass phase existing in the intergranular phase. Thus, in order to crystallize the intergranular phase of the silicon nitride sintered bodies into the diopside structure type crystals and the apatite structure type crystals, it is necessary to scrutinize the $Si_3N_4$ raw material, the composition of the additive or additives, the additive starting materials, the powder treating ways such as mixing, milling, etc., the molding way, the firing way, and the crystallizing conditions. Particularly, it is preferable that the amount of oxygen contained in the silicon nitride sintered body is from 1.3 to 2.2 times in equivalent that of a metal element or elements other than Si contained in the sintered body.

Now, a process for producing the silicon nitride sintered bodies according to the present invention will be explained in more detail. A composition including Ca, Y, a rare earth element, Mg, Fe, Ni and/or Al is formulated into an $Si_3N_4$ raw material having an appropriate amount of O, which is milled, mixed and/or heated to obtain a molding powder. In this procedure, it is preferable that an element having an ion radius being not less than 0.8 Å, such as Ca, Y and a rare earth element, is mixed into the $Si_3N_4$ powder together with an element having an ion radius being 0.5 to 0.8 Å, such as Mg, Fe, and Ni in combination. The thus formulated powder is next molded into a desired shape according to a dry type molding process, an injection molding process, a slip cast molding process, or the like, and fired in an $N_2$ atmosphere or the like under a normal pressure, an elevated pressure, a hot press, or a hot hydrostatic pressure to obtain a silicon nitride sintered body in which an intergranular phase is a glass phase. The firing conditions are selected so as to give the intended composition of the glass phase and the intended microstructure of the silicon nitride sintered body in which the silicon intride is fully densified and the glass phase in the intergranular phase is to be crystallized into the diopside structure type crystals and the apatite structure type crystals. Then, the glass phase in the intergranular phase is crystallized through temperature-maintaining during the cooling step in the firing of during reheating. The maintained temperature in the cooling step or the reheating temperature is preferably from 800 to 1,400° C. In order to precipitate fine crystals, it may be that the silicon nitride sintered body is once kept at a nucleus-producing temperature which is relatively low and then maintained again at a crystal-growing temperature which is relatively high.

As mentioned above, the silicon nitride sintered bodies according to the present invention are silicon nitride sintered bodies in which the intergranular phase produced under controlled conditions is substantially crystallized into the diopside structure type crystals and the apatite structure type crystals.

In the following, specific examples of the present in present invention will be explained, but they are merely given in illustration of the invention and should not be interpreted to limit the scope of the invention.

EXAMPLES 1-8 AND COMPARATIVE EXAMPLE 1-6

A mixture of an $Si_3N_4$ raw material powder containing 0.5% by weight of metallic element impurities and 1.7% by weight of O and having the average particle size of 0.6 μm and a BET specific surface area of 22 $m^2/g$ and additives each having a purity of not less than 99%, the average particle size of 0.3 to 2 μm and a BET specific surface area of 6 to 32 $m^2/g$ in Table 1 were formulated in recipes of Table 1, and milled in a nylon resin vessel having an inner volume of 1.2 liters for 10 hours by using a vibration mill at a vibration frequency of 1,200/min. with addition of 500 ml of water and 1.2 kg of silicon nitride magnetic media per 200 g of the formulated mixture. Then, after removal of the water through evaporation, the resulting powder was granulated in a particle size of 100 μm as a molding powder. A molding of 60×60×6 mm was prepared from the molding powder by a hydrostatic press at a pressure of 3 ton/$cm^2$, and fired and crystallized according to firing conditions and crystallization conditions shown in Table 1 to obtain the silicon nitride sintered bodies (Example Nos. 1-8) according to the present invention. Silicon nitride sintered bodies (Comparative Example Nos. 1-6) were obtained by using the same materials, formulating them with an additive or additives at a formulating recipe in Table 1, equally milling, granulating, and molding under the firing and crystallizing conditions shown in Table 1. Chemical analysis revealed that the metallic components of the sintered bodies (Examples 1-8 and Comparative Examples 1-6) were almost met with those of the formulated compositions, respectively. An amount of oxygen was also indicated in Table 1 as a number of times with respect to the other metallic components than Si in each of the sintered bodies.

With respect to these sintered bodies, the bulky density, the crystal phase of the intergranular phase, and the four point bending strengths at room temperature and at 1,200° C. as well as a stress by which the sintered body was not fractured even at 800° C. for 500 hours under a static loading and a deformed amount at that time as static fatigue characteristics are shown in Table 1.

In Table 1, the bluky densities of the sintered bodies were measured according to Archimedean process. The four point bending strength was measured according to "fine ceramics bending strength test method" in JIS 1601. The static fatigue characteristics were measured based on whether a sample having the same dimension as in the four point bending strength measurement was fractured or not by employing the same method as in the four point bending strength measurement when a constant stress was given at 800° C. for 500 hours. A deflected amount of the four point bending test sample was measured at that time to obtain a deformation amount at a tensile face thereof. The kind of the intergranular crystalline phase was determined based on results in an X-ray diffraction analysis using $CuK_\alpha$ line. In Table 1, D, A, and M are the diopside structural type crystals, the apatite structure type crystals, and mellilite structure type crystals having the same crystalline structure as the triclinic system crystals of $Y_2O_2.Si_3n_4$ shown in JCPDS card 28-1457, respectively, while K and X are crystals having the same crystalline structure as that of the $YSiO_2N$ shown in JCPDS card 31-1462 and crystals having other crystalline structure than those of D, A, M and K, respectively.

TABLE 1(a)

| | | Firing conditions | | | | |
|---|---|---|---|---|---|---|
| No. | Additive (added amount: wt %) | Atmosphere | Pressure (atm) | °C. | hours | Crystallizing conditions |
| Example | | | | | | |
| 1 | CaO(1) Y₂O₃(7) MgO(2) | N₂ | 1 | 1,650 | 1 | reheating (1,100° C., 30 minutes) |
| 2 | CeO₂(8), MgO(3), FeO(1) | N₂ | 10 | 1,750 | 0.5 | cooling in firing treatment |
| 3 | Y₂O₃(5), MgO(2), NiO(1) | N₂ | 10 | 1,800 | 1 | reheating (1,300° C., 1 hr) |
| 4 | Nd₂O₃(5), Al₂O₃(1), MgO(2) | N₂ | 10 | 1,800 | 1 | reheating (1,000° C., 6 hrs) |
| 5 | Y₂O₃(6), MgO(4), CeO₂(2) | N₂ | 1 | 1,700 | 0.5 | cooling in firing treatment |
| 6 | Y₂O₃(2), MgO(0.5) | N₂ | 150 | 1,950 | 1 | reheating (800° C., 1 hr; 1,200° C., 1 hr) |
| 7 | Gd₂O₃(3), MgO(1), FeO(1) | N₂ | 10 | 1,900 | 2 | reheating (1,400° C., 1 hr) |
| 8 | Er₂O₃(3), MgO(1), NiO(1) | N₂ | 10 | 1,850 | 2 | cooling in firing treatment |
| Comparative Example | | | | | | |
| 1 | Y₂O₃(6), MgO(4), CeO₂(2) | N₂ | 1 | 1,700 | 1 | cooling in firing treatment |
| 2 | CeO₂(8) | N₂ | 10 | 1,900 | 2 | reheating (1,400° C., 1 hr) |
| 3 | Y₂O₃(2), MgO(0.5) | N₂ | 50 | 1,950 | 1 | reheating (800° C., 1 hr; 1,200° C., 1 hr) |
| 4 | Y₂O₃(3), Al₂O₃(4) | N₂ | 10 | 1,850 | 1 | reheating (1,200° C., 12 hrs) |
| 5 | Y₂O₃(10), MgO(2), NiO(1) | N₂ | 1 | 1,700 | 1 | cooling in firing treatment |
| 6 | CaO(1), Y₂O₃(5), MgO(1) | N₂ | 10 | 1,850 | 1 | (800° C., 1 hr; 1,200° C., 0.5 hr) |

TABLE 1(b)

| No. | Oxygen amount in sintered body (times in equivalent) | Bulky density (g/cm³) | Crystalline phase | Strength (MPa) room temperature | 850° C. | 1,200° C. | Stress causing no fracturing at 800° C. for 500 hrs (MPa) | Deformation amount (%) |
| --- | --- | --- | --- | --- | --- | --- | --- | --- |
| Example | | | | | | | | |
| 1 | 1.42 | 3.2 | D, A | 550 | 530 | 520 | 450 | <0.1 |
| 2 | 1.63 | 3.3 | D, A | 710 | 700 | 700 | 650 | <0.1 |
| 3 | 2.18 | 3.2 | D, A | 820 | 830 | 810 | 750 | <0.1 |
| 4 | 1.95 | 3.3 | D, A | 810 | 800 | 830 | 750 | <0.1 |
| 5 | 1.85 | 3.2 | D, A | 700 | 690 | 720 | 650 | <0.1 |
| 6 | 2.10 | 3.2 | D, A | 780 | 790 | 740 | 700 | <0.1 |
| 7 | 1.31 | 3.3 | D, A | 830 | 830 | 820 | 500 | <0.1 |
| 8 | 1.50 | 3.2 | D, A | 900 | 910 | 880 | 650 | <0.1 |
| Comparative Example | | | | | | | | |
| 1 | 1.18 | 3.2 | A | 720 | 700 | 690 | 350 | <0.1 |
| 2 | 1.03 | 3.3 | M | 790 | 780 | 800 | self-fractured | — |
| 3 | 2.31 | 3.2 | D | 760 | 700 | 430 | 300 | <0.1 |
| 4 | 1.87 | 3.3 | D, X | 820 | 800 | 620 | 350 | <0.1 |
| 5 | 1.09 | 3.3 | K | 760 | 800 | 780 | self-fractured | — |
| 6 | 2.10 | 3.2 | X | 570 | 490 | 380 | 200 | 0.2 |

In the attached figure was shown a diffraction chart of X-ray diffraction analysis results of the silicon nitride sintered body (Example No. 5) according to the present invention by using a CuK$_\alpha$ line. Diffracting lines denoted by "a", and "b" and "c", respectively, are those of $\beta$-Si$_3$N$_4$, and the intergranular crystalline phase, respectively. The "b" and "c" denote the diffraction lines of the diopside structure type crystalline phase and the apatite structure type crystalline phase, respectively.

As obvious from Table 1, it is understood that the silicon nitride sintered bodies according to the present invention in which the intergranular phase is crystallized into the diopside structure type crystals and the apatite structure type crystals have high strength at room temperature and at high temperatures being not less than 520 MPa and extremely more excellent static fatigue characteristics at 800° C. as compared with the Comparative Examples, and are neither fractured or deformed under load of 450 MPa or a stress corresponding to not less than 60% of the strength at 800° C. for 500 hours.

As having been described, the silicon nitride sintered bodies according to the present invention have excellent density and mechanical strength and extremely excellent static fatigue characteristics.

Thus, the silicon nitride sintered bodies according to the present invention may be applied in a variety of uses, for instance, as mechanical structural materials for, such as, engine parts, gas turbine parts, etc. In this case, since the silicon nitride sintered bodies according to the present invention have excellent static fatigue characteristics, reliability of the use life of the material can be largely improved so that the invention has the extremely great industrial values.

What is claimed is:

1. A silicon nitride sintered body containing an intergranular phase, said intergranular phase being substantially crystallized into diopside structure type crystals and apatite structure type crystals, wherein the diopside structure is M$^1$M$^2$M$^3_2$M$^4_6$ in which M$^1$ is at least one element selected from the group consisting of Ca, Y, a rare earth element, Mg, Fe and Ni; M$^2$ is at least one element selected from the group consisting of Mg, Al, Fe, Ni and Si; M$^3$ is at least one element selected from the group consisting of Si and Al; and M$^4$ is at least one element selected from the group consisting of O and N, while the apatite structure is M$^5$(M$^6$M$^7_4$)$_3$M$^8$ in which M$^5$ is at least one element selected from the group consisting of Ca, Y, a rare earth element, Mg, Fe and Ni; M$^6$ is at least one element selected from the group consisting of Si and Al; M$^7$ is at least one element selected from the group consisting of O and N; and M$^8$ is at least one element selected from the group consisting of O and N.

2. A silicon nitride sintered body according to claim 1, wherein M$^1$ is Ca, M$^2$ is an element selected from the group consisting of Mg, Fe and Al, and M$^4$ is O, while the apatite structure type crystal is one selected from the group consisting of Ce$_{4.67}$(SiO$_4$)$_3$O, Y$_5$(SiO$_4$)$_3$N, and (Y$_4$Mg) (SiO$_4$)$_3$O.

3. A silicon nitride sintered body according to claim 1, wherein a bulk density of said body is not less than 3.1 g/cm$^3$ and strengths of said body at room temperature and at 1,200° C. are not less than 600 MPa.

4. A silicon nitride sintered body according to claim 1, which contains not less than 70% by weight of Si$_3$N$_4$ particles, 70% by weight of said Si$_3$N$_4$ particles being needle-like $\beta$-Si$_3$N$_4$ particles.

5. A silicon nitride sintered body according to claim 1, wherein the silicon nitride sintered body contains an amount of oxygen such that a ratio of equivalents of oxygen to equivalents of metals excluding Si in said sintered body is from 1.3:1 to 2.2:1.

* * * * *